United States Patent [19]

Tsuchiya

[11] Patent Number: 4,567,526
[45] Date of Patent: Jan. 28, 1986

[54] SERVO CONTROL CIRCUIT MODULE FOR USE IN A TELEVISION CAMERA

[75] Inventor: Kazumichi Tsuchiya, Saitama, Japan

[73] Assignee: Fuji Photo Optical Co., Ltd., Saitama, Japan

[21] Appl. No.: 434,636

[22] Filed: Oct. 15, 1982

[30] Foreign Application Priority Data

Oct. 17, 1981 [JP] Japan .................................. 56-166052

[51] Int. Cl.4 ........................ H04N 5/232; G03B 1/00
[52] U.S. Cl. .................................... 358/227; 350/255; 352/168
[58] Field of Search .................. 358/227, 228, 210; 318/618, 663; 352/140, 141, 168; 354/400; 350/255

[56] References Cited

U.S. PATENT DOCUMENTS

| 3,656,422 | 4/1972 | Hess et al. | 350/225 |
| 3,682,072 | 8/1972 | Hess et al. | 350/225 |
| 4,263,539 | 4/1981 | Barton | 318/663 |
| 4,351,590 | 9/1982 | Hirata et al. | 352/140 |
| 4,369,400 | 1/1983 | Turner et al. | 318/618 |
| 4,393,409 | 7/1983 | Kimura | 358/227 |
| 4,417,280 | 11/1983 | Yokoyama et al. | 358/227 |

Primary Examiner—Tommy P. Chin
Assistant Examiner—Michael D. Parker
Attorney, Agent, or Firm—Saidman, Sterne, Kessler & Goldstein

[57] ABSTRACT

An interchangeable servo control circuit module for use in a television camera is adapted to detachably mount to the television camera body, and is responsive to exterior signals for selectively operating either in a speed servo control mode or in a position servo control mode.

13 Claims, 2 Drawing Figures

SERVO CONTROL CIRCUIT MODULE FOR USE IN A TELEVISION CAMERA

BACKGROUND OF THE INVENTION

1. Field of the Invention

This invention relates to a servo control circuit module or unit designed for use in a television camera, and more particularly to a composite servo control circuit module comprising a speed-servo control circuit and a position-servo control circuit which is responsive to exterior signals for automatically selecting either the speed-servo control circuit or the position-servo control circuit.

2. Description of the Prior Art

There has been hitherto known a television camera system detachably equipped with servo control modules for focussing and zooming of an associated zoom lens. These focussing and zooming servo control modules are designed to be used in common or interchanged with each other. When the servo control modules are detacted from the television camera, focussing or zooming control can be effected manually.

The adaptability of one of these different servo control modules to the other (that is, their interchangeability) is a great advantage both in production and operation.

Generally, a position servo control circuit is used to effect focussing control, whereas a speed servo control circuit is used to effect zooming control. In an attempt to make those different servo control circuits interchangeable with each other in use, a servo control module may be designed which consists of those parts and circuits which the position- and speed-servo control circuits have in common, and an associated lens system may be designed as containing those remaining parts and circuits (which belong exclusively to the position- and speed-servo control circuits) in the focussing and zooming sections of the lens system respectively.

Recently there has been a demand for effecting, in addition to position servo control, speed servo control in focussing, and for effecting, in addition to speed servo control, position servo control in zooming. Also, conventional position- and speed-servo control circuits have a small number of parts in common with each other. Accordingly, an interchangeable module has such a small number of common parts built therein that a large number of remaining exclusive parts and connections must be provided to the television lens system. This devalues the merit both in design and production attributable to their interchangeability. Processing of different electric signals and mechanical coupling become increasingly difficult, too.

SUMMARY OF THE INVENTION

The object of this invention is to provide an improved servo control circuit module for use in a television camera, guaranteed free of the defects mentioned above.

To attain this object an improved servo control circuit module for use in a television camera according to this invention includes both the speed servo control circuit and the position servo control circuit in a composite or hybrid form. The hybrid servo control circuit module is responsive to exterior signals for automatically and selectively putting one the speed- and position-servo control circuits in operation when requested.

BRIEF DESCRIPTION OF THE DRAWINGS

One preferred embodiment according to this invention is described hereinafter with reference to accompanying drawings in which.

DESCRIPTION OF THE PREFERRED EMBODIMENT

Figure 1:
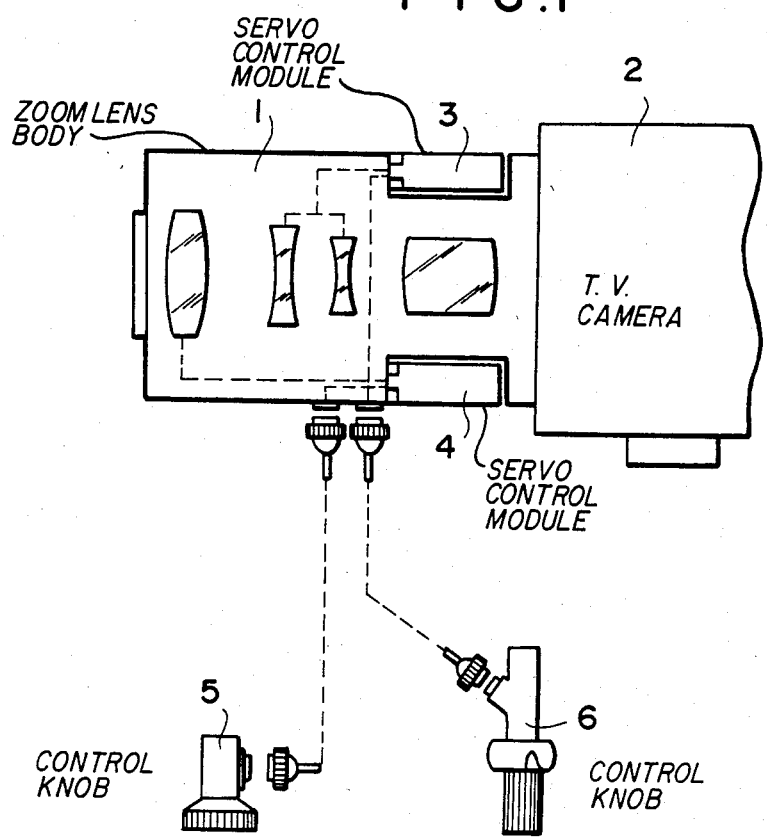
FIG. 1 shows diagramatically a television camera system which is to be equipped with a servo control circuit module according to this invention.

FIG. 1 shows a television camera system which may be equipped with a servo control circuit module according to this invention. As shown, a zoom lens body 1 is attached to a television camera body 2. The zoom lens body 1 is equipped with an interchangeable servo control module 3 for servo-controlling an associated zoom lens and another interchangeable servo control module 4 for servo-controlling an associated focussing lens. These servo control modules are designed so as to interchange with each other in use.

Servo-drive control signals are generated to appear across potentiometers (not shown) provided in a focussing control knob 5 and a zooming control knob 6, which are attached to a control rod (not shown) for the sake of panning or tilting the television camera, and the servo-drive control signals are sent to servo control modules 3 and 4 via associated cables.

Also, servo-drive feedback signals are generated to appear across a potentiometer (indicated at $P_2$ in FIG. 2, and later described), which is driven to represent the shift amount of the focussing lens or the zooming lens, and the thereby generated servo-drive feedback signals are applied to the servo control modules 3 and 4.

With this arrangement the amount of rotation, for instance, of the focussing control knob 5 is transferred to a corresponding amount of voltage (resistance) with the aid of an associated potentiometer, and the so-transferred amount (set position of the focussing lens) is supplied to the servo control module 4.

The servo control module 4 compares the input signal with a signal representing the instantaneous position of the focussing lens, and the servo control module 4 continues its servo control until the set position has been reached (position control).

Likewise, the amount of rotation of the zooming control knob 6 is transferred into a corresponding electrical amount, which is applied to the input terminals of the servo control module 3. Then, the servo control module 3 effects a servo control of the zoom lens at a speed corresponding to the amount of the input signal (speed control).

The television camera system which is described so far, is well known, and detailed description of its structure and operation need not be described, and therefore, is omitted.

Figure 2:
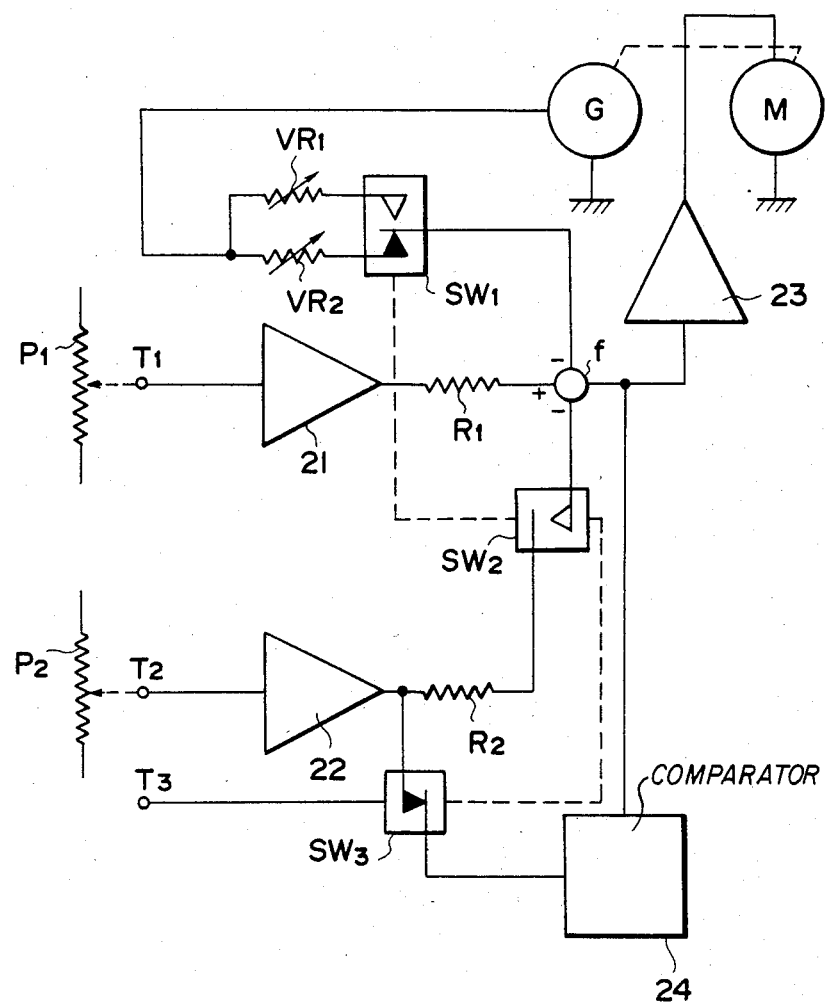
FIG. 2 shows a circuit diagram representing a servo control module according to this invention.

FIG. 2 shows a wiring diagram of an interchangeable servo control module according to this invention, which can be used as the servo control modules 3 and 4 shown in FIG. 1 and described above.

A signal representing a set point is generated to appear across a potentiometer $P_1$ associated with the focussing control knob 5 or the zooming control knob 6, and the signal is applied to an input terminal $T_1$ of a hybrid servo control circuit. Then, the input signal passes to a servo control amplifier 23 through a pre-amplifier 21 and a resistor $R_1$.

A signal representing the instantaneous position of a focussing lens or a zooming lens appears across a potentiometer $P_2$, and the feedback signal is applied to another input terminal $T_2$ of the hybrid servo control circuit to pass to a feedback point "f" through a pre-amplifier 22, a resistor $R_2$ and an analogue switch $SW_2$. When it is desired that the hybrid servo control circuit operates in the mode of speed control, a mode-selecting signal at level "L" is applied to a control terminal $T_3$ of the circuit to throw analogue switches $SW_1$ and $SW_3$ to "on" (black triangles), and analogue switch $SW_2$ to "off" (white triangle). When it is desired that the hybrid servo control circuit operates in the mode of position control, another mode-selecting signal at level "H" is applied to the control terminal $T_3$ to reversely throw analogue switches $SW_1$, $SW_2$ and $SW_3$ (black triangle, "off"; white triangle, "on").

A mode-selecting signal at either level can be applied to terminal $T_3$ manually or automatically at the time of attaching the servo control module to a television camera. An output signal from the servo drive amplifier 23 is applied to a servo motor M, and the motor M drives the focussing lens or the zooming lens, depending on the occasion, through the agency of a train of gears (not shown). Also, the servo motor M drives an associated tachogenerator G to generate a feedback signal representing the amount of rotation of the servo motor. This feedback signal is supplied to the feedback point "f" through variable resistor $VR_1$ or $VR_2$ and analogue switch $SW_1$. The variable resistor $VR_1$ is effective to prevent overshoot and hunting at or near the set position. The variable resistor $VR_2$ is effective to control the feedback amount in the mode of speed control.

An output signal from the preamplifier 22 is directed to a position detecting comparator 24 through the analogue switch $SW_3$, and an output signal from the comparator 24 is directed to the input terminal of the servo drive amplifier 23.

The comparator 24 functions as an electrical buffer when the focussing lens or the zoom lens moves to its set position. It consists of a window comparator set somewhat below the set position (for instance, below the voltage appearing between the opposite points of the potentiometer $P_2$).

In operating in the mode of speed servo control of the zoom lens or the focussing lens a mode selecting signal at level "L" is applied to the terminal $T_3$ to throw the analogue switches $SW_1$ and $SW_3$ to "on" and the analogue switch $SW_2$ to "off" (black triangle, "on").

Then, by rotating and setting the control button 6 or 5 at a given angular position a signal representing a set point is applied from the potentiometer $P_1$ to the amplifier 23, thus driving the servo motor M.

A fraction of the rotary amount of the servo motor M is fedback from the tachogenerator G to the feedback point "f" through the resistor $VR_2$, thereby allowing the motor M to run at a speed corresponding to the set value at the potentiometer $P_1$.

Thus, the speed servo control of the focussing lens or the zoom lens is effected. When the lens has reached just ahead of the set position, the position detecting comparator 24 functions to bring the potential at the input terminal of the amplifier 23 to zero or ground potential, thereby causing the motor M to stop. Thus, electrical buffering effect is caused by the position detecting comparator 24.

In operating in the mode of position servo control of the zoom lens or the focussing lens a mode selecting signal at level "H" is applied to the terminal $T_3$ to throw the analogue switches $SW_1$ and $SW_3$ to off and the analogue switch $SW_2$ to on (white triangle, "on").

Then, by rotating and setting the control button 5 or 6 at a given angular position a signal representing a set point is applied from the potentiometer $P_1$ to the amplifier 23 through the pre-amplifier 21, thus driving the servo motor M.

A signal representing the instantaneous position of the focussing lens or the zoom lens appears across the potentiometer $P_2$, and the position signal is fedback to the feedback point "f" through the amplifier 22 and the analogue switch $SW_2$, thus servo-controlling the focussing lens or the zoom lens when moving towards the final position corresponding to the set point at the potentiometer $P_1$.

A fraction of the voltage amount generated by the tachogenerator G is fedback to the feedback point "f" through the resistor $VR_1$, thereby preventing the overshoot or hunting at or near the final position of the lens.

As is apparent from the above a hybrid type servo control circuit module according to this invention is responsive to a control signal either at low or high level for selectively functioning either as a speed servo control or a position servo control, thus meeting a high-grade operation as demanded in an up-to-date television camera. The circuit is so designed that as many parts as possible are used in common, leaving the least number of possible exclusively for use in the speed-servo control or in the position servo control. Thus, the circuit design according to this invention is most advantageous in mass-production of interchangeable servo control circuit modules which are to be supplied to television cameras. Still advantageously a servo control circuit module according to this invention substantially obviates the necessity of providing circuit elements in the television camera body, and this is advantageous both in terms of production and maintenance.

I claim:

1. A servo control circuit module for use in a television camera having a zoom lens and a focussing lens, which comprises:

servo control circuit means operable in either a speed control mode or a position control mode for controlling the respective speed or position of one of said lenses in response to speed or position signals, respectively;

said servo control circuit means having several elements in common which are operative in both said speed control mode and said position control mode, said common elements including a servo motor for driving said one of said lenses, a servo drive amplifier whose output drives said servo motor, and feedback circuit means coupled between said servo motor and said servo drive amplifier; and mode selection means connected to said servo circuit means for selecting said speed control mode or said position control mode.

2. A servo control circuit module as set forth in claim 1, wherein said common elements further include a pre-amplifier for receiving said speed or said position signals and for providing an output signal to said feedback circuit means.

3. A servo control circuit module as set forth in claim 2, wherein the output from said feedback circuit means is fed as the input to said servo drive amplifier.

4. A servo control circuit module as set forth in claim 1, further comprising means for providing a position signal indicative of the instantaneous position of said one of said lenses, said position signal being compared in comparator means to a set point signal.

5. A servo control circuit module as set forth in claim 4, wherein the output from said position signal providing means is connected to said feedback circuit means when said servo control circuit means is in said position control mode.

6. A servo control circuit module as set forth in claim 4, wherein said comparator means for receiving said position signal from said position signal providing means, functions to ground the input signal of said servo drive amplifier when said servo control circuit means is in said speed control mode.

7. A servo control circuit module as set forth in claim 4, wherein said means for selecting said speed control mode or said position control mode includes means for switching said position signal between said feedback means and said position detecting comparator.

8. A servo control circuit module as set forth in claim 7, wherein said position detecting comparator is in circuit between said means for providing a position signal and said servo drive amplifier when said servo control circuit means is in said speed control mode.

9. A servo control circuit module for use in a television camera having a zoom lens and a focussing lens comprising:
(a) servo control circuit means operable in either a speed control mode or a position control mode for controlling the speed or position, respectively, of one of said lenses in response to a speed or position input signal, respectively, said circuit means including:
  (i) a servo motor coupled to move one of said lenses and to develop a feedback signal representative of such movement;
  (ii) feedback circuit means for receiving said feedback signal and said input signal and for generating a drive signal in response thereto;
  (iii) servo drive amplifier means for amplifying said drive signal and for generating a signal to drive said servo motor; and
  (iv) means for generating a position signal indicative of the instantaneous position of one of said lenses;
(b) means for receiving said position signal and for providing a second feedback signal to said feedback circuit means when in said position control mode or to said servo drive amplifier means when in said speed control mode, said position signal receiving means comprising a position detecting comparator in circuit with said servo drive amplifier means for comparing said position signal to a set point signal when in said speed control mode; and
(c) means connected to said servo control circuit means for selecting said position control mode or said speed control mode.

10. A servo control circuit module as set forth in claim 9, wherein said one of said lenses comprises the zoom lens of the television camera.

11. A servo control circuit module as set forth in claim 9, wherein said one of said lenses comprises the focussing lens of the television camera.

12. A servo control circuit module as set forth in claim 9, wherein said means for selecting said speed control mode or said position control mode includes means for switching said second feedback signal between said feedback means and said comparator.

13. A servo control circuit module as set forth in claim 9, wherein said position signal receiving means is also in circuit and operative with said servo control circuit means in both said speed control mode and said position control mode.

* * * * *